United States Patent [19]

Seybold et al.

[11] Patent Number: 4,595,511

[45] Date of Patent: Jun. 17, 1986

[54] PROCESS FOR STIMULATING PETROLEUM PRODUCTION WELLS

[75] Inventors: Anton Seybold, Höchstadt an der Aisch, Fed. Rep. of Germany; Alejandro Gutierrez, Mendoza, Argentina; Pablo Arkenberg, Buenos Aires, Argentina; Mario Daino, Mendoza, Argentina

[73] Assignee: Hoechst Aktiengesellschaft, Fed. Rep. of Germany

[21] Appl. No.: 580,431

[22] Filed: Feb. 15, 1984

[30] Foreign Application Priority Data

Feb. 16, 1983 [AR] Argentina .............................. 292148

[51] Int. Cl.$^4$ .............................................. E21B 37/06
[52] U.S. Cl. ................................. 252/8.55 B; 166/304
[58] Field of Search ..................... 252/8.55 B, 8.55 D; 166/304, 305 R

[56] References Cited

U.S. PATENT DOCUMENTS

| | | |
|---|---|---|
| 2,753,303 | 7/1956 | Barker . |
| 2,753,939 | 7/1956 | Carpenter et al. ............. 252/8.55 X |
| 2,908,641 | 10/1959 | Boyle . |
| 3,241,614 | 3/1966 | Bertness .............................. 166/304 |
| 3,402,770 | 9/1968 | Messenger ......................... 252/8.55 |
| 3,970,148 | 7/1976 | Jones et al. . |
| 4,005,020 | 1/1977 | McCormick . |
| 4,090,562 | 5/1978 | Maly et al. ...................... 252/8.55 X |
| 4,207,193 | 6/1980 | Ford et al. .......................... 252/8.55 |

FOREIGN PATENT DOCUMENTS

| | | |
|---|---|---|
| 1178137 | 1/1970 | United Kingdom . |
| 2090857 | 7/1982 | United Kingdom . |

*Primary Examiner*—Herbert B. Guynn
*Attorney, Agent, or Firm*—Connolly and Hutz

[57] ABSTRACT

Process for stimulating petroleum production wells by injecting, into the production well, a solution of higher aromatics (high-flash aromatics) which contains a mixture comprising 50-90% of an oxyalkylated $C_{12}$-$C_{22}$-mono- or -di-alkylamine or alkenylamine and 10 to 50% of a petroleum emulsion-breaker. In addition, the solution can also contain oxyalkylated alkylphenols, fatty acids and glycol ethers. This stimulation method produces an excellent influx of oil, a very high oil table and hence a significantly raised rate of production.

1 Claim, No Drawings

PROCESS FOR STIMULATING PETROLEUM PRODUCTION WELLS

The present invention relates to an improved process for stimulating petroleum production wells by using specific surface-active compounds in the form of solutions in higher aromatics.

It is known that with older drillings in particular there are increasing petroleum production problems due to the accumulation of petroleum constituents having a relatively high molecular weight, such as asphaltenes, naphthenes, paraffins and resinous compounds, in the intake zone of the production wells. As a result, the oil permeability of the reservoir is much reduced, so that the influx of crude oil decreases, and only interval production is still possible at a rate of, for example, 2–4 $m^3$ of crude oil/day and well.

In order to reduce these problems and to increase the output, it is known to inject acids, for example, into the petroleum-bearing layers. Acid-soluble rock is attacked by the acid, and the porosity of the formation is increased, which then brings with it an increase of the permeability for the crude oil. However, this acidifying has the disadvantage that it damages the formation. The same is true of fracturing, where the petroleum-bearing formation is fractured by means of hydraulic forces. A further method of well-stimulation consists in injecting mixtures of benzene, toluene and xylene. However, these compounds are poor solvents for the higher-molecular constituents of crude oils, so that large amounts of these solvents are required.

The following points are important in well-stimulation with solvents and chemicals: use of optimal solvents for asphaltenes and naphthenes; simultaneous use of nonionic surface-active substances for achieving good penetration by the injected liquid; simultaneous use of emulsion-breakers which are adapted to the particular type of crude oil and which are to prevent an emulsion block forming, in particular in old and highly water-flooded production wells; use of solvents or solubilizers for the paraffins present; and simultaneous use of surface-active compounds which easily penetrate in between the rock and the heavy crude oil phase and hence increase the water-wetting of the rock, if not make it possible in the first place. As a result of these measures the formation close to the borehole is made markedly more oil-permeable.

The present invention accordingly provides a process for stimulating petroleum production wells by injecting, into the production well, higher aromatics which contain a mixture comprising 50 to 90% by weight of an amine of the formula $$R^1R^2NH$$

where $R^1$ denotes $C_{12}$–$C_{22}$-alkyl or $C_{12}$–$C_{22}$-alkenyl, and $R^2$ denotes hydrogen, $C_{12}$–$C_{22}$-alkyl or $C_{12}$–$C_{22}$-alkenyl which has been reacted with 4 to 20 moles of ethylene oxide, 6 to 12 moles of propylene oxide or 4 to 20 moles of a mixture of the two alkylene oxides, and 10 to 50% by weight of an emulsion-breaker.

This emulsion-breaker can in general be any product which is suitable for breaking emulsions of petroleum and water. The following products are particularly preferred for this purpose: diisocyanate resins (German Auslegeschrift No. 1,642,825), etherified phenol-formaldehyde condensation products (resol resins, German Auslegeschrift No. 2,445,873), oxyalkylated alkyl-phenol-formaldehyde condensation products (U.S. Pat. Nos. 2,499,368, 4,499,370, 2,524,889, 2,560,333 and 2,574,543), addition products of ethylene oxide/propylene oxide block polymers and bis-glycidyl ethers (German Offenlegungsschrift No. 3,049,455), oxyalkylated addition products of ethylene oxide/propylene oxide block polymers and bis-glycidyl ethers (German Offenlegungsschrift No. 3,049,450) and oxyalkylated resol resins (German Auslegeschrift No. 2,445,873 and German Patent Application No. P 32 23 691.3). The emulsion-breakers can in general be used individually or in the form of mixtures of various kinds of breakers. This also applies to the amines of the formula $R^1R^2NH$.

In addition to the oxyalkylated amines listed and the emulsion-breakers it is also possible to use in the mixture still further compounds, such as oxyalkylated mono-, di- or tri-($C_4$–$C_{12}$)alkylphenols containing 4 to 40 units of ethylene oxide, propylene oxide or a mixture thereof, preferably octylphenol or nonylphenol having 6 to 20 ethylene oxide units; synthetic or natural, saturated and unsaturated $C_{12}$–$C_{22}$-fatty acids, such as oleic acid, coconut acid or ricinoleic acid, as well as mono- or di-($C_3$–$C_8$)alkyl di-, tri- or tetra-ethylene glycol ethers, preferably butylglycol. If these compounds are also used in the mixture, then the mixture which is dissolved in the higher aromatics has the following composition: 10 to 70, preferably 30 to 50, % of oxyalkylated amine, 1 to 30, preferably 5 to 20, % of emulsion-breaker, 1 to 30, preferably 5 to 20, % of oxyalkylated alkylphenol, 1 to 30, preferably 5 to 20, % % of fatty acid and 1 to 50, preferably 5 to 30, of glycol ether.

The products listed above are dissolved in highflash aromatics which have a flash point above 40° C. and a minimum proportion of about 90% of mono- or poly-$C_1$–$C_{10}$-alkyl-substituted ($C_6$–$C_{14}$)-aromatic hydrocarbons or ($C_6$–$C_{14}$)-cycloalkanes, the balance comprising noncyclic, for example, linear and branched, ($C_4$–$C_{16}$)-hydrocarbons. The concentration of the mixture of all the abovementioned products in the solvent is 1 to 30, preferably 8 to 20, % by weight. This solution is injected into the petroleum production wells by methods customary for this purpose.

By means of the well-stimulation described above it was surprisingly possible to produce an enormously high oil table above the production zone, which result is a sign of excellent influx of oil from the reservoir. This effect persisted for the duration of one year with only slight differences. It was unexpected that the result would be so good and long-lasting. The remarkable effectiveness is presumably due to the fact that the solution described above increases the relative oil permeability to such an extent that, as a result of removing resistances to flow, only a small proportion of the sparingly soluble components of the oil is able to reaccumulate during the subsequent production. The novel well-stimulation process requires about 9,000 to 50,000 liters of solution per performance. By comparison, the known well-stimulation process using low-boiling aromatics requires 150,000 to 200,000 liters. It is a further advantage of the process according to the invention that the reservoir is not damaged and that the surfactant mixture is stable under the conditions in the reservoir. Also noteworthy is the short injection time, which makes it possible to keep unproductive downtime to a minimum. The crude oil produced after the stimulation, which still contains an amount of stimulating agent, can be refined without problems.

EXAMPLE 1

A production well, sunk in 1951, had an initial production of 32 m³ of oil/day and, by July 1981, had produced totals of 70,724 m³ of crude oil, 15,959 m³ of water and 1,057,610 m³ of gas. In July 1981 the production per day was below 2 m³ of pure oil (lifted by means of interval pumps). After installation of a packer at the level of the production zone (at a depth of 2,298 m–2,345 m) a total of 9.5 m³ of the product mixture described hereinbelow was injected in the course of 12 hours and was then left to act for 24 hours. In the course of the subsequent initial production 28 m³ of oil were lifted per day, and the oil table had risen very considerably in the well from 645 m before the treatment to 1,900 m above the production zone. After 12 months an average production of 8–10 m³/day was achieved and the oil table had stabilized at 1,500 m. This demonstrates an enormous influx from the reservoir. It was not possible to exploit the potential production level in full because of the age of the well equipment. The increase in production reached 300–400%.

The product mixture used consisted of an 8% strength solution, in high-flash aromatics, of a mixture of the following composition:

- 23% by weight of oleylamine + 10 ethylene oxide units,
- 20% by weight of oleylamine + 15 ethylene oxide units,
- 13% by weight of butylglycol,
- 13% by weight of the diisocyanate resin in accordance with example 1 of German Auslegeschrift No. 1,642,825,
- 15% by weight of oleic acid,
- 16% by weight of nonylphenol + 10 ethylene oxide units.

EXAMPLE 2

14.5 m³ of a product mixture of the composition given below were injected into a production well in the same manner as in example 1. In this experiment too, the oil table rose very considerably in the well, as a result of the extremely good influx after the treatment on the well, to 2,100 m above the production zone (previously 850 m). After some months the oil table stabilized at 1,850 m. This stimulation raised the production of crude oil from initially about 35 m³ per day to an average of 50 m³ of oil per day, i.e. by about 42%.

The product mixture used consisted of an 8% strength solution, in high-flash aromatics, of a mixture of the following composition:

- 16% by weight of oleylamine + 10 ethylene oxide units,
- 27% by weight of oleylamine + 15 ethylene oxide units,
- 13% by weight of butylglycol,
- 13% by weight of oxyalkylated phenol-formaldehyde condensation product in accordance with example 1 of German Auslegeschrift No. 2,445,873
- 15% by weight of oleic acid,
- 16% by weight of nonylphenol + 10 ethylene oxide units.

EXAMPLE 3

The production rate of this well was 27 m³ of oil/day. 42 m³ of a product mixture of the composition given below were injected into this well in the course of 12 hours in a manner analogous to example 1. The downtime after the pumping in was 48 hours. After the treatment the oil table rose in the well from previously about 900 m above the production zone to a level of 1,900 m above the production zone. The production of crude oil rose to 44 m³ of oil per day. Production was thus increased by about 63%. The product mixture used in this stimulation had the following composition:

- 15% by weight of cocoamine + 8 ethylene oxide units,
- 29% by weight of cocoamine + 12 ethylene oxide units,
- 14% by weight of butylglycol,
- 13% by weight of oxyalkylated addition product of ethylene oxide/propylene oxide block polymers and bisglycidyl ethers as described in example 1a of German Auslegeschrift No. 3,049,450,
- 14% by weight of sunflower fatty acid,
- 15% by weight of octylphenol + 10 ethylene oxide units.

We claim:

1. A process for dissolving high molecular weight constituents of petroleum in underground formations communicating with a production well which comprises injecting into the production well high-flash aromatic liquid having a flash point above 40° C. and a minimum proportion of about 90% of mono- or poly-$C_1$–$C_{10}$-alkyl-substituted $C_6$–$C_{14}$ aromatic hydrocarbons or $C_6$–$C_{14}$-cycloalkanes, the balance comprising non-cyclic hydrocarbons said liquid containing 1 to 30% by weight of a mixture comprising

- 10 to 70% by weight of oxyalkylated amine, said oxyalkylated amine being obtained by reacting an amine of the formula $R^1R^2NH$, wherein $R^1$ denotes $C_{12}$–$C_{22}$-alkyl or $C_{12}$–$C_{22}$-alkenyl, and $R^2$ denotes hydrogen, $C_{12}$–$C_{22}$-alkenyl or $C_{12}$–$C_{22}$-alkyl, with 4 to 20 moles of ethylene oxide, 6 to 12 moles of propylene oxide or 4 to 20 moles of a mixture of the two alkylene oxides;
- 1 to 30% of emulsion breaker;
- 1 to 30% of mono-, di-, or tri-($C_4$–$C_{12}$)alkylphenols containing 4 to 40 units of ethylene oxide, propylene oxide or a mixture thereof;
- 1 to 30% of $C_{12}$–$C_{22}$-fatty acids; and
- 1 to 50% of mono- or di-($C_3$–$C_8$)-alkyl, di-, tri- or tetra-ethylene glycol ethers.

* * * * *